US009667091B2

United States Patent
Baek et al.

(10) Patent No.: US 9,667,091 B2
(45) Date of Patent: May 30, 2017

(54) BATTERY PACK WITH WIRELESS CHARGING AND NEAR FIELD COMMUNICATION FUNCTIONS

(71) Applicant: SAMSUNG SDI CO., LTD., Yongin-si, Gyeonggi-do (KR)

(72) Inventors: Woonseong Baek, Yongin-si (KR); Pilho Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 91 days.

(21) Appl. No.: 14/836,926

(22) Filed: Aug. 26, 2015

(65) Prior Publication Data

US 2016/0190856 A1 Jun. 30, 2016

(30) Foreign Application Priority Data

Dec. 24, 2014 (KR) .................. 10-2014-0188459

(51) Int. Cl.
*H02J 7/02* (2016.01)
*H02J 7/04* (2006.01)
*H04W 4/00* (2009.01)

(52) U.S. Cl.
CPC ............. *H02J 7/025* (2013.01); *H02J 7/042* (2013.01); *H04W 4/008* (2013.01)

(58) Field of Classification Search
CPC ............ H02J 7/025; H02J 7/04; H04W 4/008
USPC ........................................................ 320/108
See application file for complete search history.

(56) References Cited

U.S. PATENT DOCUMENTS

| 8,890,470 B2 * | 11/2014 | Partovi ................. H01F 7/0252 320/108 |
| 2011/0050164 A1 * | 3/2011 | Partovi et al. .......... H01F 5/003 320/108 |
| 2012/0098486 A1 * | 4/2012 | Jung ...................... H02J 7/025 320/108 |
| 2013/0157565 A1 | 6/2013 | Clement et al. |
| 2015/0054455 A1 | 2/2015 | Kim et al. |

FOREIGN PATENT DOCUMENTS

| KR | 10-1385706 B1 | 4/2014 |
| KR | 10-2014-0101795 A | 8/2014 |
| KR | 10-2014-0120671 A | 10/2014 |

OTHER PUBLICATIONS

Abstract Publication No. KR 2013-0088858 A, dated Aug. 8, 2013, for KR 10-1385706 B1, 2 pages.

\* cited by examiner

*Primary Examiner* — Sun Lin
(74) *Attorney, Agent, or Firm* — Lewis Roca Rothgerber Christie LLP (57) ABSTRACT

A battery pack includes an antenna attached to a battery cell, a sensor configured to sense an energy level induced in the antenna, a controller configured to determine, according to a sensed signal of the sensor, whether the energy level is a first energy level for wireless charging or is a second energy level for near field communication, and a switch connecting the antenna to a battery charger or a near field communication circuit according to a control signal of the controller.

11 Claims, 9 Drawing Sheets

BATTERY PACK WITH WIRELESS CHARGING AND NEAR FIELD COMMUNICATION FUNCTIONS

CROSS-REFERENCE TO RELATED APPLICATION

This application claims priority to and the benefit of Korean Patent Application No. 10-2014-0188459, filed on Dec. 24, 2014 in the Korean Intellectual Property Office, the content of which is hereby incorporated by reference in its entirety.

BACKGROUND

1. Field

Aspects of embodiments of the present invention relate to a battery pack.

2. Description of the Related Art

Recently developed mobile communication terminals have antennas for near field communication. The near field communication has enabled a mobile communication terminal to be used as, for example, a transit fare system in subways, buses, taxis, and the like, or as a payment system in a variety of electronic transactions. In general, an antenna is attached to a battery pack of a terminal or to a terminal case. When the antenna is attached to the battery pack of the terminal, for example, the antenna may be attached to a battery cell using an adhesion layer.

SUMMARY

Aspects of embodiments of the present invention provide a battery pack capable of performing both a wireless charging function and a near field communication function using a shared antenna.

Aspects of embodiments of the present invention provide a battery pack capable of performing both a wireless charging function and a near field communication function by electrically isolating a high-voltage region for wireless charging and a low-voltage region for near field communication from each other, thereby preventing the high-voltage region and the low-voltage region from electrically interfering each other.

The above and other aspects of embodiments of the present invention will be described in or will be apparent from the following description of example embodiments.

According to an aspect of the present invention, there is provided a battery pack including an antenna attached to a battery cell, a sensor configured to sense an energy level induced in the antenna, a controller configured to determined, according to a sensed signal of the sensor, whether the energy level is a first energy level for wireless charging or is a second energy level for near field communication, and a switch connecting the antenna to a battery charger or a near field communication circuit according to a control signal of the controller.

When the energy level is determined as the first energy level, the controller may be configured to control the switching part to connect the antenna to the battery charger, and when the energy level is determined as the second energy level, the controller may be configured to control the switching part to connect the antenna to the near field communication circuit.

The energy level may correspond to a voltage, a current, a power, or a frequency level.

The first energy level and the second energy level may be different from each other.

The battery charger may include: an AC-DC converter connected to the switch, and a charging circuit between the AC-DC converter and the battery cell.

The sensor, the controller, the switch, the battery charger, and the near field communication circuit may be mounted on a circuit board, and the circuit board may be combined with the battery cell.

The battery charger and the near field communication circuit are electrically separated from each other.

The circuit board may further include: an antenna terminal connected to an antenna wire of the antenna; and a mounting groove in which the antenna wire of the antenna is mounted.

An insulation member may further be between the antenna wire and the circuit board or may be between the antenna wire and the battery cell.

The antenna may include: a ferrite layer attached to the battery cell, and an antenna pattern attached to the ferrite layer.

The battery cell may be a prismatic battery or a pouch-type battery.

As described above, the battery pack according to embodiments of the present invention is capable of performing both a wireless charging function and a near field communication function using a shared antenna. For example, the wireless charging function is enabled or the near field communication function is enabled according to the energy level received (or induced) through or in one shared antenna. In an example, when the energy level induced through one shared antenna is a first energy level (e.g., a predetermined first energy level), the wireless charging function is turned on and the near field communication function is turned off. In another example, when the energy level induced through one shared antenna is a second energy level (e.g., a predetermined second energy level), the near field communication function is turned on and the wireless charging function is turned off.

In addition, the battery pack according to embodiments of the present invention is capable of performing both a wireless charging function and a near field communication function by electrically isolating a high-voltage region for wireless charging and a low-voltage region for near field communication from each other, thereby preventing the high-voltage region and the low-voltage region from electrically interfering each other. For example, the high-voltage region for wireless charging and the low-voltage region for near field communication are mounted on a circuit board to be completely electrically disconnected from each other so that electrical interference does not occur between the high-voltage region for wireless charging and the low-voltage region for near field communication.

BRIEF DESCRIPTION OF THE DRAWINGS

The above and other features and aspects of the present invention will become more apparent by describing in detail example embodiments thereof with reference to the attached drawings in which.

DETAILED DESCRIPTION

Hereinafter, some example embodiments of the present invention are described in further detail with reference to the accompanying drawings.

Example embodiments will now be described more fully hereinafter with reference to the accompanying drawings; however, the present invention may be embodied in different forms and should not be construed as limited to the embodiments set forth herein. Rather, these embodiments are provided so that this disclosure will be thorough and complete, and will fully convey the present invention to those skilled in the art.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention". Expressions, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly. As used herein, the terms "use," "using," and "used" may be considered synonymous with the terms "utilize," "utilizing," and "utilized," respectively.

The terminology used herein is for the purpose of describing particular example embodiments only and is not intended to be limiting of example embodiments. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The controller(s) and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the controller(s) and/or any other relevant devices may be formed on one integrated circuit (IC) chip or on separate IC chips. Further, the various components of the controller(s) may be implemented on a flexible printed circuit film, a tape carrier package (TCP), a printed circuit board (PCB), or formed on a same substrate as the controller(s). Further, the various components of the [device] may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Hereinafter, a battery pack with wireless charging and near field communication functions according to an embodiment of the present invention will be described with reference to FIGS. 1A to 1C.

Figure 1A:
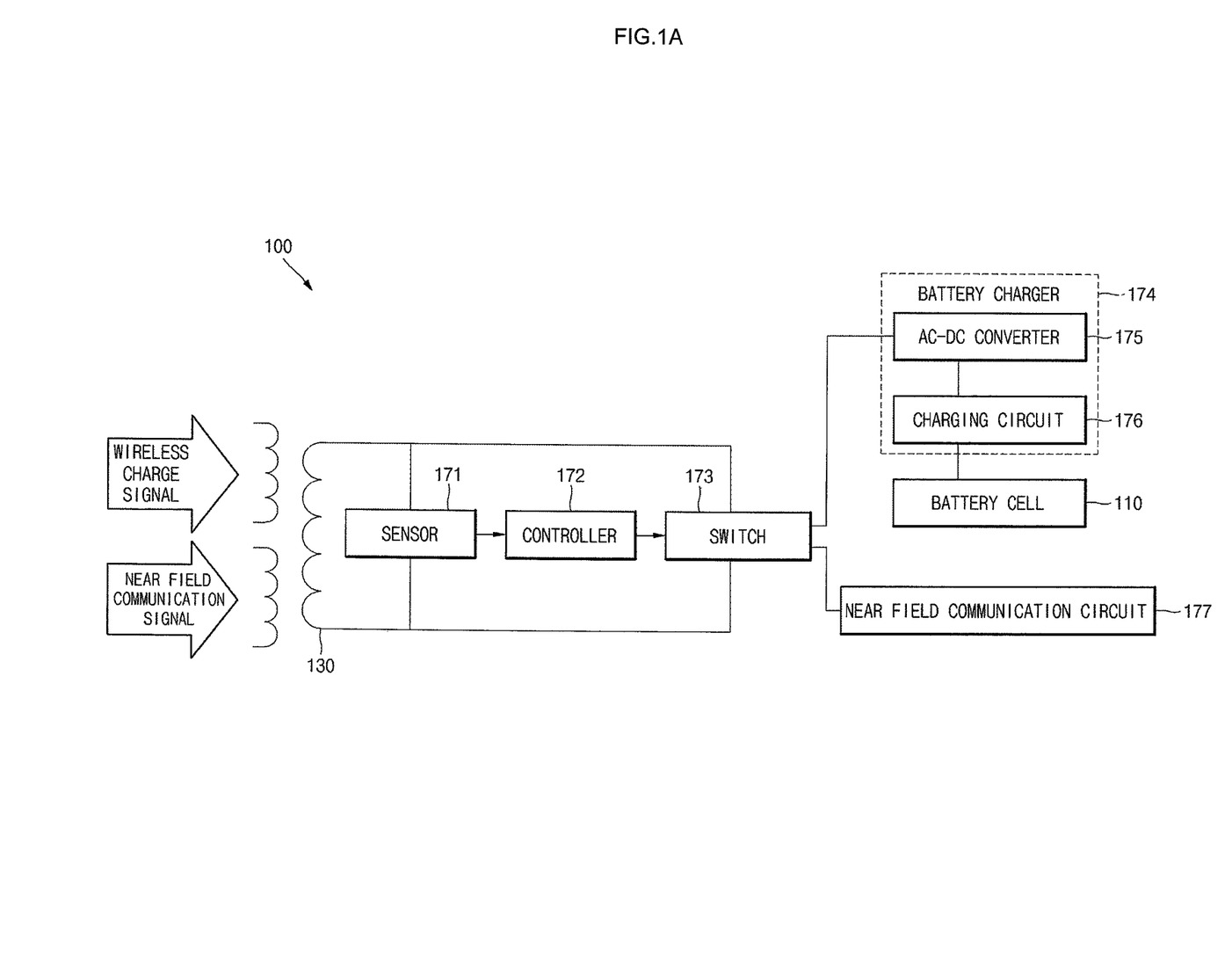
FIG. 1A is a block diagram illustrating a configuration of a battery pack with wireless charging and near field communication functions according to an embodiment of the present invention.
Figure 1B:
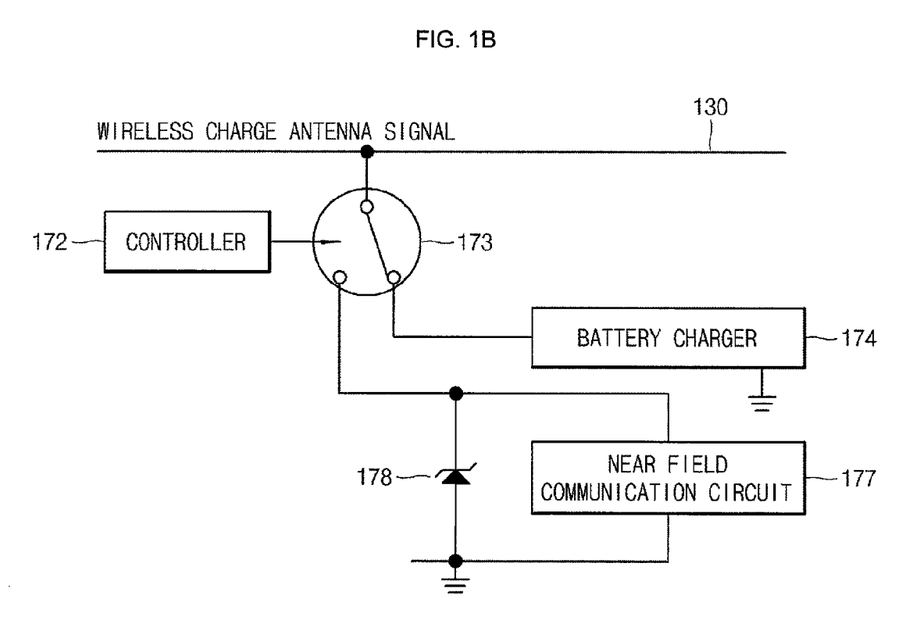
FIG. 1B is an exemplary circuit diagram configured for a wireless charging operation.
Figure 1C:
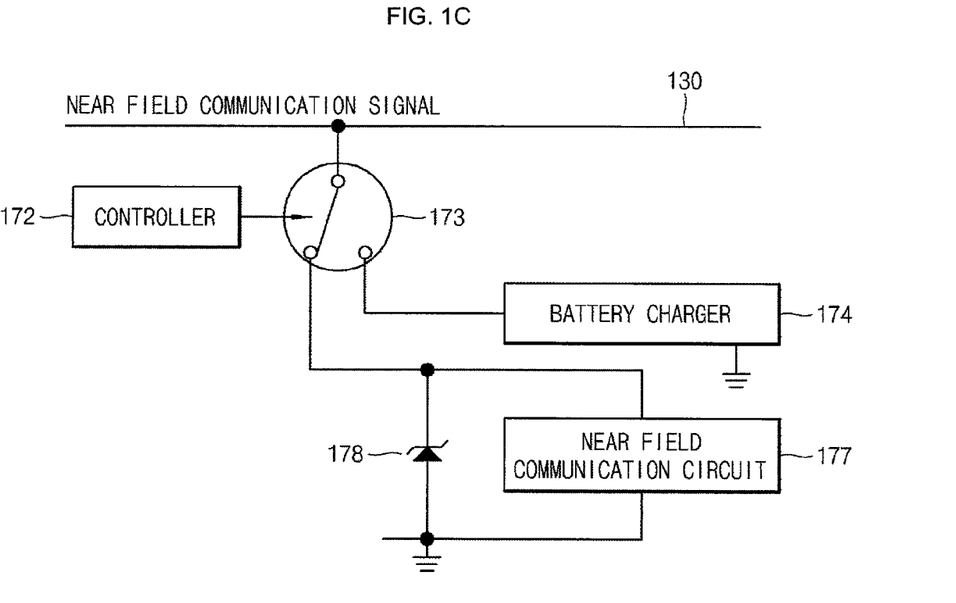
FIG. 1C is an exemplary circuit diagram configured for a near field communication operation.

FIG. 1A is a block diagram illustrating a configuration of a battery pack with wireless charging and near field communication functions according to an embodiment of the present invention, FIG. 1B is an exemplary circuit diagram configured for a wireless charging operation, and FIG. 1C is an exemplary circuit diagram configured for a near field communication operation.

As illustrated in FIG. 1A, a battery pack 100 with wireless charging and near field communication functions according to an embodiment of the present invention may include an antenna 130 (e.g., an antenna part), a sensor 171 (e.g., a sensing part), a controller 172, a switch 173 (e.g., a switching part), a battery charger 174 (e.g., a battery charging part), and a near field communication circuit 177 (e.g., a near field communication part).

The antenna 130, which will be further described below, is installed at a long-side region and/or a short-side region of a battery cell 110 and is configured to receive a wireless charging signal and/or a near field communication signal. For example, the wireless charging signal and/or the near field communication signal may be induced through the antenna 130.

In one embodiment, wireless charging may indicate that the battery cell 110 is wirelessly charged by supplying power without an electric wire being connected thereto, and the wireless charging may be performed in a magnetic induction manner, a magnetic resonance manner, a microwave manner, and equivalents thereof. However, the present invention is not limited to the methods of wireless charging as listed herein. In addition, near field communication allows two-way data communication between two or more terminals within a short distance of, for example, about 10 cm, and an NFC format, a Bluetooth format, a ZigBee format, a Wi-Fi format, or an equivalent thereof may be used to provide the near field communication, but aspects of the present invention are not limited thereto.

The sensor 171 senses an energy level received (or induced) through the antenna 130 and converts the energy level into an electric signal and then transmits the converted signal to the controller 172. For example, when a wireless charging signal (e.g., a first energy level) is induced to the antenna 130, the sensor 171 transmits a first sensing signal corresponding to the wireless charging signal to the controller 172. When a near field communication signal (e.g., a second energy level) is induced to the antenna 130, the sensor 171 transmits a second sensing signal corresponding to the near field communication signal to the controller 172.

In one embodiment, the energy level is a level of voltage, current, power, and/or frequency. In one embodiment, when the energy is in the form of voltage, current, or power, the first energy level is greater than the second energy level. For example, when the energy is in the form of power, the first energy level may be generally in a range of several watts (w) to several kilowatts (kw) and the second energy level may be generally in a range of several microwatts ($\mu$w) to several milliwatts (mw). When the energy is in the form of frequency, the first energy level is less than the second energy level. For example, when the energy is in the form of frequency, the first energy level may be in a range of several hertz (Hz) to several tens hertz (Hz) and the second energy level may be in a range of several megahertz (MHz) to several tens megahertz (MHz).

As described above, the sensor 171 transmits the first sensing signal corresponding to the wireless charging signal (e.g., the first energy level) and/or the second sensing signal corresponding to the near field communication signal (e.g., the second energy level) to the controller 172, and the controller 172 may output (e.g., immediately output) a control signal (e.g., a predetermined control signal) to the switch 173 without a significant time delay. Therefore, during near field communication, for example, there may be no significant operating time delay or data loss.

When the first sensing signal is received by the sensor 171, the controller 172 determines that the sensed energy level corresponds to (e.g., is) the first energy level for wireless charging. When the second sensing signal is received by the sensor 171, the controller 172 determines that the sensed energy level corresponds to (e.g., is) the second energy level for near field communication. Further, the controller 172 outputs control signals corresponding to the first sensing signal and the second sensing signal to the switch 173.

In one embodiment, when the energy level sensed by the sensor 171 is (e.g., is determined to be) the first energy level, the controller 172 outputs a first control signal (e.g., a predetermined first control signal) to the switch 173. When the energy level sensed by the sensor 171 is (e.g., is determined to be) the second energy level, the controller 172 outputs a second control signal (e.g., a predetermined second control signal) to the switch 173.

The switch 173 electrically connects the antenna 130 to the battery charger 174 or electrically connects the antenna 130 to the near field communication circuit 177. In one embodiment, when the first control signal is output from the controller 172, the switch 173 electrically connects the antenna 130 to the battery charger 174. In this case, the antenna 130 is electrically disconnected from the near field communication circuit 177. When the second control signal is output from the controller 172, the switch 173 electrically connects the antenna 130 to the near field communication circuit 177. In this case, the antenna 130 is electrically disconnected from the battery charger 174.

The switch 173 may be implemented by one of a 3-terminal switch, a relay, a silicon controlled rectifier (SCR), a gate turn off (GTO), a bipolar junction transistor (BJT), an insulated gated bipolar transistor (IGBT), a metal oxide silicon field effect transistor (MOSFET), and equivalents thereof, but aspects of the present invention are not limited thereto.

In order to facilitate the fast operation of the switch 173, the sensor 171, the controller 172, and the switch 173 may be implemented in one system on chip (SOC) or in a system in chip (SIP), but aspects of the present invention are not limited thereto.

The battery charger 174 may include an AC-DC converter 175 and a charging circuit 176. The AC-DC converter 175 converts an alternating current (AC) voltage induced from the antenna 130 to a direct current (DC) voltage and outputs the converted DC voltage to the charging circuit 176. In one embodiment, the AC-DC converter 175 supplies a DC voltage of about 5 V to the charging circuit 176. In addition, the charging circuit 176 charges the battery cell 110 with the supplied DC voltage (e.g., the supplied DC voltage of about 5 V).

In one embodiment, the charging circuit 176 may charge the battery cell 110 in a constant-voltage constant-current (CV/CC) mode and may include a protection circuit for protecting the battery cell 110 from being overcharged. In one embodiment, if a charge voltage of the battery cell 110 exceeds a reference voltage, the protection circuit blocks a charging path.

Therefore, the battery cell 110 may not be overcharged due to the protection circuit. The battery cell 110 may generally be a prismatic battery, a pouch-type battery, a cylindrical battery, and equivalents thereof, but aspects of the present invention are not limited thereto. As described above, the charging circuit 176 charges the battery cell 110 using a wireless charging method (e.g., in a wireless charging mode) without using an electric wire or using a constant-voltage constant-current method (e.g., in the constant-voltage constant-current mode). In one embodiment, the battery cell 110 may be charged using less than a reference (e.g., a predetermined) charge voltage.

The near field communication circuit 177 may include, for example, an NFC matching circuit, an NFC controller, and/or a memory, thereby performing data communication between a mobile communication terminal and an external terminal. In one embodiment, the near field communication circuit 177 may be electrically connected to the mobile communication terminal rather than to the battery cell 110 to allow data communication between both terminals. One or more of the NFC matching circuit, the NFC controller, and/or the memory may be mounted on the mobile communication terminal rather than the battery pack. In one embodiment, the near field communication circuit 177 may enter (e.g., perform), for example, a card emulation mode in which the mobile communication terminal operates like a conventional RFID card reader, a read/write mode in which mobile communication terminal operates as a card reader, or a P2P mode in which two compatible devices communicate with each other. In one embodiment, the near field communication circuit 177 is described as a mobile communication terminal by way of example, but aspects of the present invention are not limited thereto. For example, the near field communication circuit 177 may be applied to a home appliance, a personal computer (PC), or an equivalent thereof.

As illustrated in FIG. 1B, when the signal sensed from the antenna 130 is at the first energy level, the controller 172 controls the switch 173 to electrically connect the antenna 130 to the battery charger 174, such that the antenna 130 and the near field communication circuit 177 are electrically disconnected from each other.

As illustrated in FIG. 1C, when the signal sensed from the antenna 130 is at the second energy level, the controller 172 controls the switch 173 to electrically connect the antenna 130 to the near field communication circuit 177 such that the antenna 130 and the battery charging circuit 174 are electrically disconnected from each other.

In view of voltage and current thereof, the wireless charging signal generally has a greater energy level than that of the near field communication. In view of operating time thereof, a wireless charging time is generally longer than a near field communication time. Therefore, as illustrated in FIG. 1C, the controller 172 according to an embodiment of the present invention is configured such that the switch 173 generally (e.g., in a normal state) electrically connects the antenna 130 to the near field communication circuit 177 and electrically connects the antenna 130 to the battery charger 174 when (e.g., only when) a relatively high energy level (e.g., the first energy level) is input for a relatively long time. Therefore, according to embodiments of the present invention, the near field communication is performed without an error for a relatively short time, thereby improving reliability of the near field communication.

Because the near field communication circuit 177 is prone to damage by the relatively high energy level (e.g., the first energy level), a transient voltage suppression (TVS) device 178 for bypassing an over-voltage or an over-current may be connected between the switch 173 and the near field communication circuit 177. In one embodiment, the TVS device 178 is connected between the switch 173 and the near field communication circuit 177. Thus, even if a high-voltage wireless charging signal is input through the antenna 130 in a state in which the antenna 130 and the near field communication circuit 177 are electrically connected by the switch 173, the near field communication circuit 177 can be safely protected by the TVS device 178.

As described above, aspects of embodiments of the present invention provide a battery pack configured to perform both a wireless charging function and a near field communication function using a shared antenna.

In addition, aspects of embodiments of the present invention provide a battery pack configured to perform both a wireless charging function and a near field communication function by electrically isolating a high-voltage region for wireless charging and a low-voltage region for near field communication from each other, thereby preventing the high-voltage region and the low-voltage region from electrically interfering each other.

Further, according to aspects of embodiments of the present invention, a shared antenna performs a near field communication function, and when a wireless charging signal is input, a TVS device protects a near field communication circuit, and then, the near field communication circuit is turned off while a battery charger is turned on, thereby facilitating the near field communication function without an error. In addition, in the battery pack according to embodiments of the present invention, the near field communication circuit may not be damaged even by a wireless charging signal having a relatively high voltage.

Figure 2A:
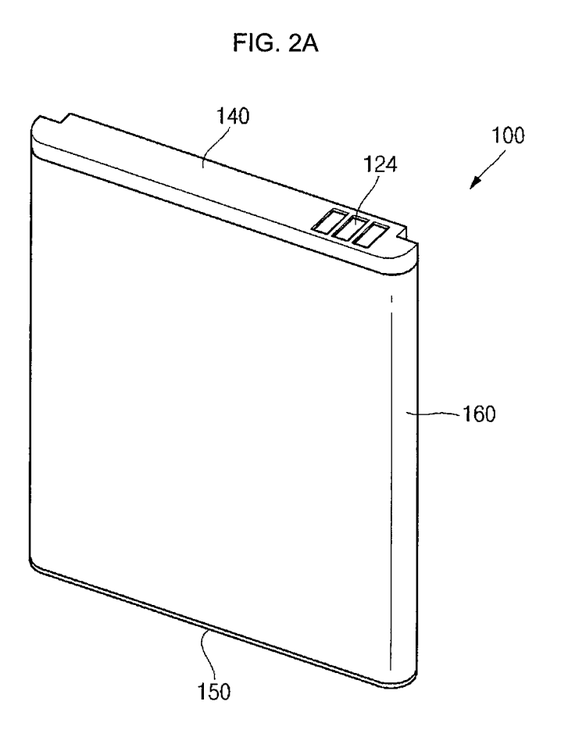
FIGS. 2A and 2B are a perspective view and an exploded perspective view, respectively, of a battery pack with wireless charging and near field communication functions according to an embodiment of the present invention.
Figure 2B:
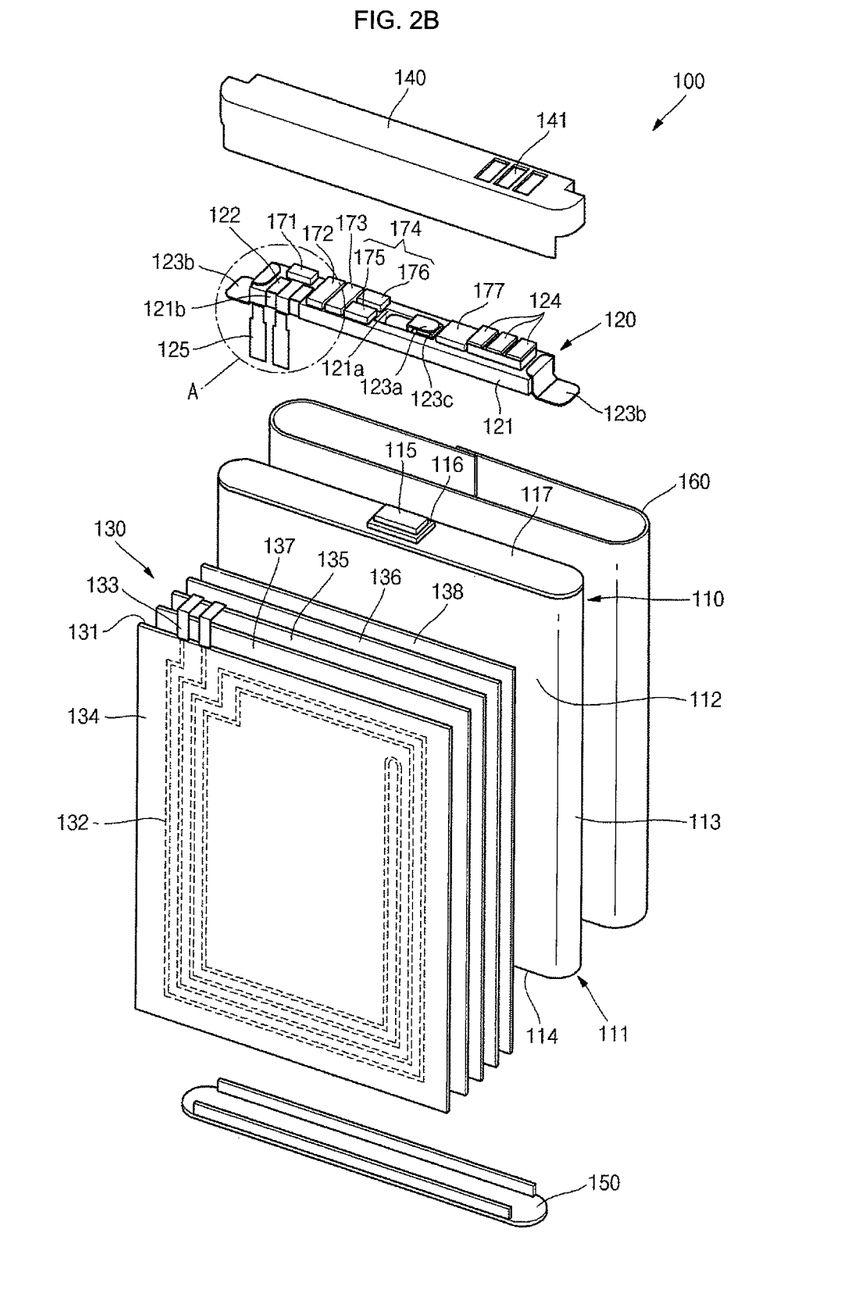
Figure 3:
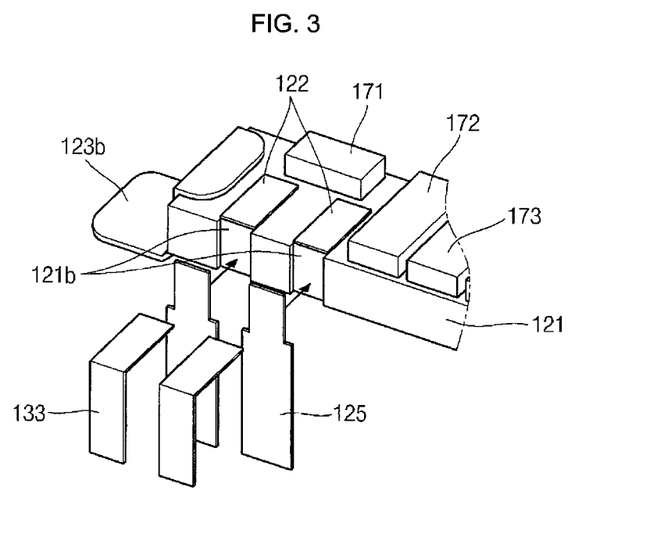
FIG. 3 is an enlarged view illustrating the region 'A' of FIG. 2B.
Figure 4:
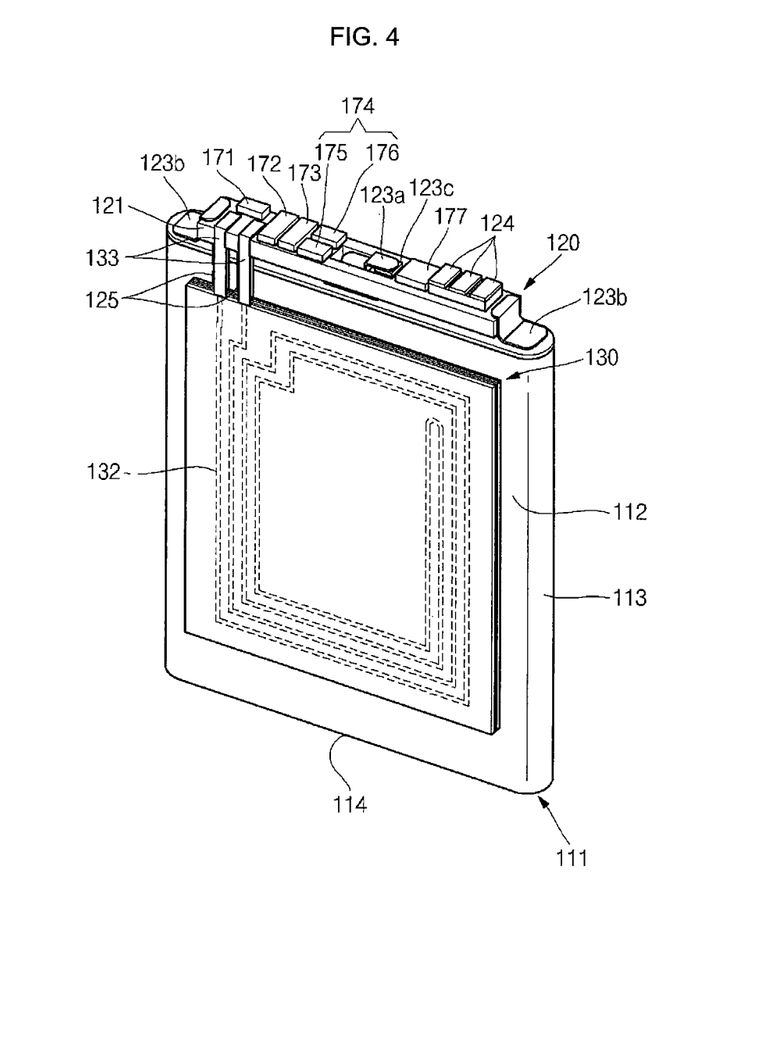
FIG. 4 is a partially assembled perspective view of a battery pack with wireless charging and near field communication functions according to an embodiment of the present invention.

FIGS. 2A and 2B are a perspective view and an exploded perspective view, respectively, of a battery pack with wireless charging and near field communication functions according to an embodiment of the present invention, FIG. 3 is an enlarged view illustrating the region 'A' of FIG. 2B, and FIG. 4 is a partially assembled perspective view of a battery pack with wireless charging and near field communication functions according to an embodiment of the present invention.

As illustrated in FIGS. 2A and 2B, the battery pack 100 with wireless charging and near field communication functions according to an embodiment of the present invention includes a battery cell 110, a circuit module 120, an antenna 130, a top cover 140, a bottom cover 150, and a label 160. In this embodiment, the circuit module 120 may include a relatively high voltage region and a relatively low voltage region. The high voltage region and the low voltage region, which are electrically disconnected (e.g., completely electrically disconnected) from each other, are mounted on the circuit module 120 to prevent interference from occurring therebetween. In addition, in order to improve reception (e.g., induction) efficiency of the wireless charging signal and/or the near field communication signal and to improve rigidity, the antenna 130 may include a ferrite layer 135 and a reinforcement layer 136.

The battery cell 110 includes a prismatic can 111, an electrode assembly, an electrode terminal 115, an insulation gasket 116, and a cap plate 117. The electrode assembly is received into the can 111 through an opening formed at one side of the can 111, and the opening is sealed by the cap plate 117. The battery cell 110 has a positive electrode and a negative electrode and may be a minimum unit of a battery pack configured to perform charging and discharging. In one embodiment, the prismatic can 111 may also be referred to as a prismatic case.

The can 111 may have a substantially flat rectangular parallelepiped shape having a hollow. For example, the can 111 has two relatively wide long side surfaces 112, two relatively narrow short side surfaces 113 connecting the two long side surfaces 112, and a bottom surface 114 connecting the two long side surfaces 112 and the two short side surfaces 113. The opening in the can 111 is formed opposite to the bottom surface 114. In addition, the two short side surfaces 113 may be curved. The can 111 may be made of aluminum, an aluminum alloy, iron, an iron alloy, steel use stainless (SUS), and equivalents thereof, but aspects of the present invention are not limited thereto. In addition, the can 111 itself may function as an electrode terminal (e.g., a positive electrode terminal).

The electrode assembly may include a positive electrode plate, a negative electrode plate, and a separator. The separator is positioned between the positive electrode plate and the negative electrode plate, and the electrode assembly may be generally wound or stacked in a jelly-roll configuration. The electrode assembly may be inserted into the can 111 through the opening of the can 111. The electrode assembly is received in (e.g., accommodated in) the can 111 together with an electrolyte solution.

The electrode terminal 115 is surrounded by the insulation gasket 116. The electrode terminal 115 may upwardly protrude and/or be exposed while passing through the cap plate 117. In addition, the electrode terminal 115 may be electrically connected to, for example, the negative electrode plate, and the cap plate 117 may be electrically connected to, for example, the positive electrode plate. Therefore, the electrode terminal 115 may be a negative electrode and the cap plate 117 and the can 111 may be a positive electrode.

The cap plate 117 seals the opening of the can 111, which has been described above, thereby preventing the electrode assembly and the electrolyte contained in the can 111 from being dislodged to the outside and/or leaking out. To this end, the cap plate 117 may be, for example, laser-welded to a top end of the can 111.

The circuit module 120 is positioned on the battery cell 110 and is electrically connected to the battery cell 110. To this end, the circuit module 120 includes a circuit board 121 having an opening 121a (e.g., a through-hole), an antenna terminal 122, internal terminals 123a and 123b, and external terminals 124. In addition, the circuit module 120 may further include a sensor 171, a controller 172, a switch 173, a battery charger 174 and, a near field communication circuit 177 which are mounted on the circuit board 121.

Additionally, the circuit module 120 may include a protective circuit device for protecting against over-charge/over-discharge/over-current/etc. formed on the circuit board 121, which is widely known to one skilled in the art and a detailed description thereof will not be given.

The circuit board 121 may be generally a rigid printed circuit board or a flexible circuit board and may have the roughly centrally formed opening 121a into which a welding tool is inserted to allow the internal terminal 123a to be electrically connected to the electrode terminal 115 of the battery cell 110.

The antenna terminal 122 is formed on a surface of the circuit board 121 and an antenna wire 133 is electrically connected to the antenna terminal 122. For example, a groove 121b having a depth (e.g., a predetermined depth) may be formed at a lateral portion of the circuit board 121 to allow the antenna wire 133 to pass from the battery cell 110 up to the antenna terminal 122, and an insulating sheet 125 (or an insulating layer) may be placed in the groove 121b. The groove 121b formed at the lateral portion of the circuit board 121 prevents the antenna wire 133 from excessively protruding to outside the battery cell 110, thereby facilitating an assembling process of the battery pack 100. In addition, the insulating sheet 125 (or the insulating layer) may prevent a conductive pattern formed on the circuit board 121 and the antenna wire 133 from being electrically shorted (e.g., short-circuited) to each other.

The internal terminals 123a and 123b include a first internal terminal 123a connected to the electrode terminal 115 of the battery cell 110 and second internal terminals 123b connected to the cap plate 117 of the battery cell 110. One end of the first internal terminal 123a is connected to the electrode terminal 115 of the battery cell 110 and the other end of the first internal terminal 123a is connected to a positive temperature coefficient (PTC) device 123c. The PTC device 123c is electrically connected to the circuit board 121. In addition, one end of each of the second internal terminals 123b is connected to the cap plate 117 of the battery cell 110, and the other end of each of the second internal terminals 123b is connected to the circuit board 121. In this embodiment, the second internal terminals 123b may be at opposite ends of the circuit board 121 to allow the circuit board 121 to be stably positioned on the cap plate 117 of the battery cell 110.

The external terminals 124 may be formed on a surface of the circuit board 121 and have block (e.g., rectangular) shapes which allows a mobile communication terminal, a wired charger, and/or the battery charger 174 to be electrically connected to the battery cell 110. The mobile communication terminal may be supplied with power from the battery cell 110 (that is, the battery cell 110 is discharged) through the external terminals 124 or the battery cell 110 may be charged through the external terminals 124 in a wireless and/or wired manner. In some embodiments, a near field communication signal may be transmitted/received between the antenna 130 and the mobile communication terminal through a region of the external terminal 124, which is not associated with charging or discharging. In an embodiment in which the near field communication circuit 177 independently performs near field communication with another terminal, the near field communication is not performed between the antenna 130 and the mobile communication terminal through the external terminal 124. In this embodiment, the near field communication circuit 177 is completely electrically disconnected from the external terminal 124. In this embodiment, the charging circuit 176 of the battery charger 174 is connected to the external terminal 124 through a conductive pattern of the circuit board 121.

The sensor 171, the controller 172, the switch 173, and the battery charger 174 may be mounted at one side of the circuit board 121 about the opening 121a, and the near field communication circuit 177 may be mounted at the other side of the circuit board 121 about the opening 121a. For example, when the sensor 171, the controller 172, the switch 173, and the battery charger 174 are defined as a first group and the near field communication circuit 177 is defined as a second group, the first group and the second group may not be completely electrically separated from each other. While the sensor 171, the controller 172, and the switch 173 are independently formed in the illustrated embodiment, they may be formed as a single SOP or SIP, thereby reducing the overall package volume while increasing the operating speed. In addition, in the illustrated embodiment, the first group and the second group are electrically disconnected from each other about the opening 121a, but aspects of the present invention are not limited thereto. The first group and the second group may be electrically disconnected from each other about the controller 172 or the switch 173.

In another embodiment, when the battery charger 174, including the AC-DC converter 175 and the charging circuit 176, and the external terminal 124 for performing charging and/or discharging of the battery cell 110 are defined as a first group and the near field communication circuit 177 is defined as a second group, the first group and the second group may be completely electrically disconnected from each other. For example, referring back to FIGS. 1B and 1C, it is understood that the battery charger 174 and the near field communication circuit 177 are completely electrically disconnected from each other even though they are physically connected to the switch 173.

Therefore, according to embodiments of the present invention, a high-voltage region associated with wireless charging and/or wired charging or discharging of the battery cell 110 and a low-voltage region associated with near field communication are electrically disconnected (e.g., completely electrically disconnected) from each other, thereby reducing or preventing electrical interference from occurring between the high-voltage region and the low-voltage region.

The top cover 140 and the bottom cover 150 cover upper and lower regions of the circuit module 120 and the battery cell 110, respectively. For example, the top cover 140 covers a top portion of the battery cell 110 while covering the circuit module 120. A plurality of openings 141 are formed in the top cover 140, thereby allowing the external terminals 124 formed in the circuit module 120 to be exposed to the outside. The top cover 140 and the bottom cover 150 may be pre-fabricated using a general plastic resin to then be combined with the circuit module 120 corresponding to the top portion of the battery cell 110 and the lower portion of the battery cell 110 in an interference fit manner. The top cover 140 and the bottom cover 150 may be formed such that the circuit module 120 and the battery cell 110 are mounted in a mold and a molten plastic resin is then inserted into the mold and cooled.

The label 160 wraps the entire long and short-side surfaces 112 and 113 of the battery cell 110 and wraps some regions of the top cover 140 and the bottom cover 150. For example, the label 160 covers the antenna 130, thereby protecting the antenna 130 from external shocks. The top cover 140, the bottom cover 150, and the label 160 may protect the battery cell 110, the circuit module 120, and the antenna 130 from external shocks. In one embodiment, the label 160 includes an outer surface on which a product name, a trade mark, product details, a dimension or volume of the product, production date, production, marketing, and use methods, and so on, may be described. In addition, the label 160 may include an adhesive layer formed on one surface thereof (e.g., on an inner surface thereof) and may be formed of a surface-treated polyethylene film or a surface-treated polyester film, but the present invention does not limit the material of the label 160 to those listed herein.

In another embodiment, instead of the label 160, a hard external case made of, for example, a rigid plastic material may be used. In this embodiment, the antenna 130 may be pre-fabricated on an inner surface of the hard external case and then be combined with the battery cell 110.

As described above, the battery pack 100 according to an embodiment of the present invention provides both wireless charging and near field communication functions using a shared antenna. In addition, the battery pack 100, according to an embodiment of the present invention, provides both wireless charging and near field communication functions without electrical interference by electrically isolating a high-voltage region for wireless charging and a low-voltage region for near field communication from each other.

Figure 5:
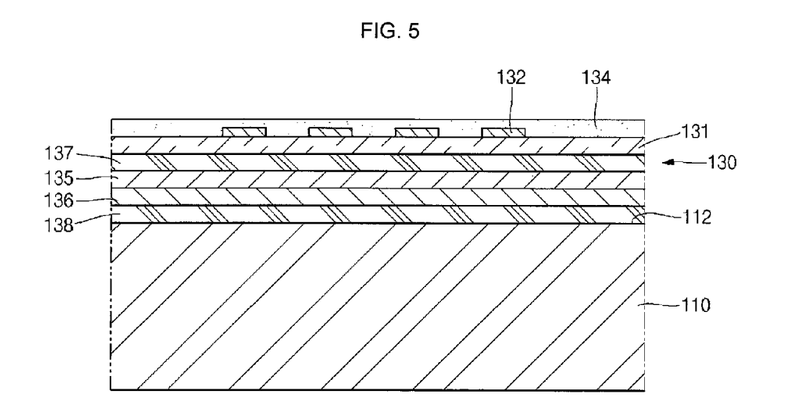
FIG. 5 is a cross-sectional view of an antenna of the battery pack with wireless charging and near field communication functions according to an embodiment of the present invention.

FIG. 5 is a cross-sectional view of an antenna of the battery pack with wireless charging and near field communication functions according to an embodiment of the present invention.

The antenna 130 may be positioned on one of the two long-side surfaces 112 of the battery cell 110. In some embodiments, two antennas 130 may be provided and positioned on the two long-side surfaces 112 of the battery cell 110, respectively. The antenna 130 may have a substantially flat rectangular shape so as to correspond to the shape of each of the two long-side surfaces 112 of the battery cell 110 and may include an insulation layer 131, an antenna pattern 132, an antenna wire 133 (see FIG. 2B), and a protection layer 134. The antenna pattern 132 is formed on a surface of the insulation layer 131 in the form of a loop which is protected by the protection layer 134 by being covered. In a state in which the antenna wire 133 is connected to the antenna pattern 132, the antenna wire 133 may extend and protrude a length (e.g., a predetermined length) outside of the insulation layer 131 and the protection layer 134.

In one embodiment, the insulation layer 131 may be made of polyimide (PI) or polyethylene terephthalate (PET), the antenna pattern 132 and the antenna wire 133 may be made of copper or nickel, and the protection layer 134 may be made of photo-imageable solder resist (PSR), but aspects of the present invention are not limited thereto. In addition, the antenna wire 133 is electrically connected to the antenna pattern 132 and outwardly protrudes, extends, and is exposed by a length (e.g., a predetermined length). The antenna wire 133 is electrically connected to the antenna terminal 122 (see FIG. 2B) provided in the circuit module 120. In addition, the antenna 130 may be positioned on one of the two short-side surfaces 113 of the battery cell 110. Alternatively, the antenna 130 may be positioned on both of the long-side surface 112 and the short-side surface 113.

The antenna 130 may further include a ferrite layer 135, a reinforcement layer 136, and adhesion layers 137 and 138.

The ferrite layer 135 may be positioned between the battery cell 110 and the antenna pattern 132 and may have a flat rectangular panel shape. The ferrite layer 135 may reduce eddy current generated in the antenna pattern 132 and may focus magnetic flux passing through the antenna pattern 132, thereby improving the frequency sensitivity of transmitted or received signals. For example, the ferrite layer 135 has relatively high magnetic permeability which improves the frequency sensitivity of transmitted or received signals of the antenna pattern 132, thereby providing the battery pack 100 with good (e.g., improved) wireless charging and near field communication functions.

The ferrite layer 135 may be made of a sintered ferrite metal. For example, the ferrite layer 135 may be made of one selected from nickel ferrite, zinc ferrite, nickel zinc ferrite, barium ferrite, combinations thereof, and equivalents thereof. When the ferrite layer 135 is made of nickel zinc ferrite, it may include 47 wt % to 48 wt % of iron oxide, 30 wt % of nickel oxide, 20 wt % of zinc oxide, and 2 wt % to 3 wt % of copper oxide.

The ferrite layer 135 has a thickness in a range of approximately 5 µm to 30 µm. If the thickness of the ferrite layer 135 is smaller than approximately 5 µm, it may be liable to break when subjected to even relatively small shocks. If the thickness of the ferrite layer 135 is greater than approximately 30 µm, the battery pack 100 may become bulky, resulting in a reduction in the density of the battery pack 100 relative to the capacity of the battery cell 110.

The reinforcement layer 136 is positioned between the battery cell 110 and the ferrite layer 135 and may have a substantially rectangular flat panel shape. Even if adhesion between the adhesive layers 137 and 138 and the label 160, which will be further described later, is reduced, the reinforcement layer 136 can prevent external deformation of the antenna pattern 132 and the ferrite layer 135, thereby preventing the wireless charging and near field communication functionality from being reduced. In addition, the reinforcement layer 136 may further reduce the frequency deviation of transmitted and received signals of the antenna pattern 132 compared to the conventional art.

The reinforcement layer 136 may include at least one selected from copper, aluminum, stainless steel, combinations thereof, and equivalents thereof, but the present invention does not limit the material of the reinforcement layer 136 to those listed herein.

In addition, the reinforcement layer 136 may have a thickness in a range of approximately 0.1 µm to 2.0 µm. If the thickness of the reinforcement layer 136 is less than approximately 0.1 µm, it is difficult to prevent external deformation of the antenna pattern 132 and the ferrite layer 135 due to a change (e.g., a change in shape) in the battery pack 100 over time. If the thickness of the reinforcement layer 136 is greater than approximately 2.0 µm, the external deformation of the antenna pattern 132 and the ferrite layer 135 due to the change in the battery pack 100 over time can be sufficiently prevented, however, the overall thickness of the battery pack 100 may be increased.

In this embodiment, the reinforcement layer 136 may be directly formed on the bottom surface of the ferrite layer 135 by plating, coating, sputtering, vacuum deposition, or equivalents thereof. Therefore, the ferrite layer 135 and the reinforcement layer 136 are integrally formed, and the reinforcement layer 136 reinforces the brittleness of the ferrite layer 135. In this embodiment, the ferrite layer 135 is adhered to the insulation layer 131 by the first adhesive layer 137. Thus, the reinforcement layer 136 may reinforce the rigidity of the ferrite layer 135 and the antenna pattern 132. For example, the reinforcement layer 136 reduces or prevents external deformation of the ferrite layer 135 and the antenna pattern 132.

The adhesion layers 137 and 138 include a first adhesion layer 137 and a second adhesion layer 138. The first adhesion layer 137 is provided between the ferrite layer 135 and the antenna pattern 132 and couples the ferrite layer 135 and the antenna pattern 132 to each other. In addition, the second adhesion layer 138 is provided between the battery cell 110 and the reinforcement layer 136 and couples the battery cell 110 and the reinforcement layer 136 to each other. In this embodiment, the first adhesion layer 137 and the second adhesion layer 138 may be a double-sided adhesive tape, a liquid-type adhesive, combinations thereof, and equivalents thereof, but the present invention does not limit the materials of the first adhesion layer 137 and the second adhesion layer 138 to those listed herein.

Figure 6:
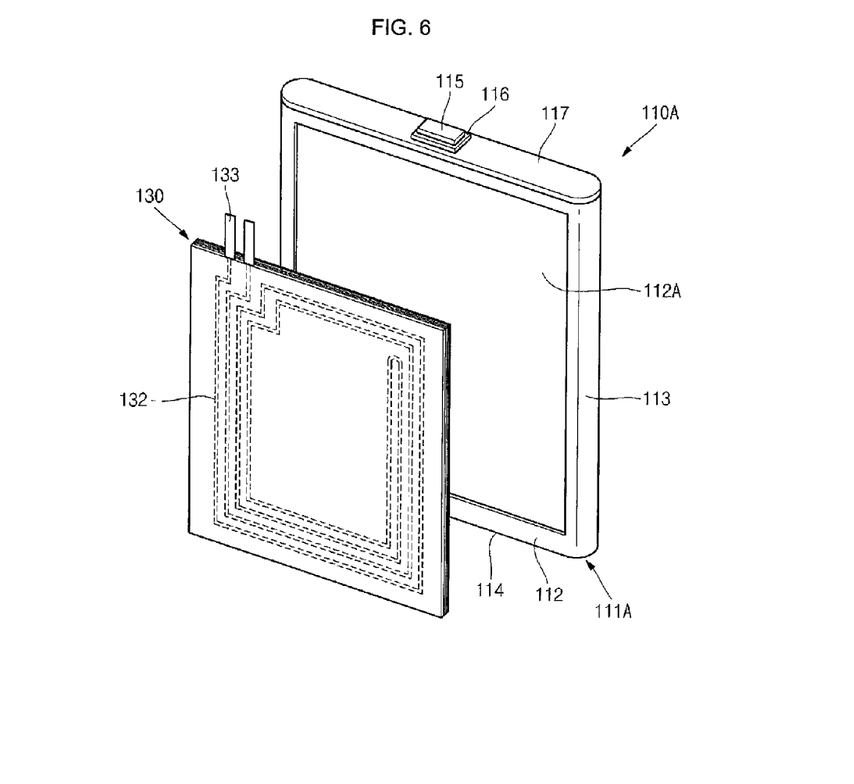
FIG. 6 is an exploded perspective view of a battery pack with wireless charging and near field communication functions according to another embodiment of the present invention.

FIG. 6 is an exploded perspective view of a battery pack with wireless charging and near field communication functions according to another embodiment of the present invention.

Referring to FIG. 6, the battery pack according to another embodiment of the present invention includes a battery cell 110A having a groove 112A (e.g., a recessed portion) and an antenna 130 placed in (e.g., arranged in) the groove 112A of the battery cell 110A.

The groove 112A may be formed on a long side surface 112 of the battery cell 110A, for example, a long side surface 112 of a can 111A, to have a shape corresponding to a shape of the antenna 130. Example embodiments include only a reinforcement layer 136 being mounted in the groove 112A, the reinforcement layer 136 and a ferrite layer 135 being mounted in the groove 112A, and the reinforcement layer 136, the ferrite layer 135, and an antenna pattern 132 being mounted in the groove 112A, but the present invention is not limited to these example embodiments. A first adhesive layer 137 is interposed between the antenna pattern 132 and the ferrite layer 135, and a second adhesive layer 138 is interposed between the reinforcement layer 136 and the can 111A.

Therefore, because the reinforcement layer 136 is mounted in the groove 112A of the battery cell 110A, the reinforcement layer 136 and the ferrite layer 135 are mounted in the groove 112A of the battery cell 110A, or the reinforcement layer 136, the ferrite layer 135, and the antenna pattern 132 are mounted in the groove 112A of the battery cell 110A, a space (e.g., a space beyond the can 111A) occupied by these elements can be reduced or minimized, thereby maintaining the volume of the battery pack to a relatively small size while not reducing or substantially reducing the capacity of the battery cell 110A.

The battery pack according to the present embodiment is substantially the same as the battery pack 100 according to the previous embodiment in view of configurations, functions, and effects thereof, except for a configuration of the battery cell 110A and connection structures of the battery cell 110A and the reinforcement layer 136. Accordingly, explanations or descriptions of the ferrite layer 135 and/or the antenna pattern 132 may be omitted.

Figure 7:
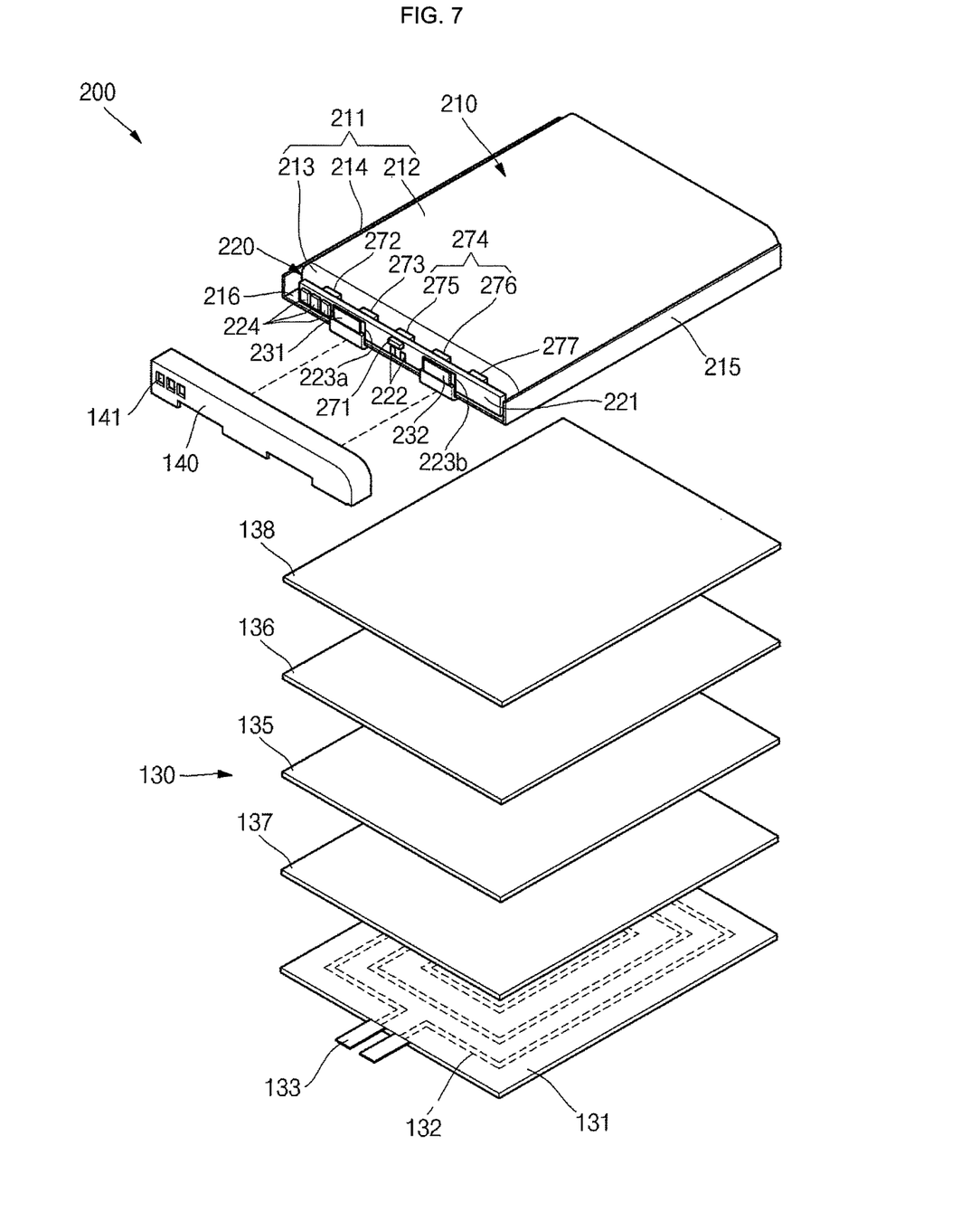
FIG. 7 is an exploded perspective view of a battery pack with wireless charging and near field communication functions according to still another embodiment of the present invention.

FIG. 7 is an exploded perspective view of a battery pack with wireless charging and near field communication functions according to still another embodiment of the present invention.

As illustrated in FIG. 7, the battery pack 200 according to still another embodiment of the present invention includes a pouch-type battery 210 as a battery cell rather than the prismatic battery of the previously-described embodiments. For example, an antenna 130 having the same or substantially the same configuration as that described above may be adhered to one side surface of the pouch-type battery 210, and a circuit module 220 having the same or substantially the same configuration as that described above may be coupled to one side surface of the pouch-type battery 210.

The pouch-type battery 210 includes an electrode assembly, a pouch-type external case 211 enclosing the electrode assembly and an electrolyte solution, and a first electrode tab 231 and a second electrode tab 232 electrically connected to the electrode assembly and extending outside of the pouch-type external case 211.

The pouch-type external case 211 has two long-side surfaces 212 formed at opposite regions and are relatively wide, and four short-side surfaces 213 and 214 connecting the long-side surfaces 212 formed at opposite regions and are relatively narrow. Wing portions 215 folded in one direction are formed on the two short-side surfaces 214 among the four short-side surfaces 213 and 214 and an extending portion 216 outwardly extending on one short-side surface 213 among the four short-side surfaces 213 and 214 while the first and second electrode tabs 231 and 232 pass through the extending portion 216.

A circuit module 220 is disposed on the extending portion 216 in an upright position and is also electrically connected to the first and second electrode tabs 231 and 232 of the pouch-type battery 210.

The circuit module 220 includes a circuit board 221, an antenna terminal 222, internal terminals 223a and 223b, and external terminals 224. The circuit module 220 may further include a battery charger 274 mounted on the circuit board 221, and the battery charger 274 may include one or more of a sensor 271, a controller 272, a switch 273, an AC-DC converter 275, a charging circuit 276, and a near field communication circuit 277. The circuit module 220 may also include a plurality of protection circuit devices formed on the circuit board, which are well known to one skilled in the art and an explanation thereof will not be further given.

The antenna terminal 222 is formed on a surface of the circuit board 221, and an antenna wire 133 is electrically connected to the antenna terminal 222.

The internal terminals 223a and 223b are connected to the first and second electrode tabs 232a and 232b of the pouch-type battery 210.

The external terminals 224 may be formed on the surface of the circuit board 221, which allows a mobile communication terminal to be electrically connected to the pouch-type battery cell 210. Charging and discharging of the battery cell 210 may be performed through the external terminal 124, and a near field communication signal may be transmitted or received between the antenna 130 and the mobile communication terminal.

The sensor 271, the controller 272, the switch 273, and the battery charger 274 may be mounted at one side of the circuit board 221, and the near field communication circuit 277 may be mounted at the other side of the circuit board 221. For example, when the sensor 271, the controller 272, the switch 273, and the battery charger 274 are defined as a first group and the near field communication circuit 277 is defined as a second group, the first group and the second group may be electrically separated (e.g., completely electrically separated) from each other. In addition, while the sensor 271, the controller 272 and the switch 273 are independently formed in the illustrated embodiment, they may be formed as a single SOP or SIP in other embodiments, thereby reducing the overall package volume while increasing the operating speed.

In another embodiment, when only the battery charger 274 and the external terminal 124 are defined as a first group and the near field communication circuit 277 is defined as a second group, the first group and the second group may be completely electrically disconnected from each other.

As described above, according to embodiments of the present invention, the battery pack 100 capable of performing both of wireless charging and near field communication functions using a shared antenna is provided. In addition, the battery pack 100 capable of performing wireless charging and near field communication functions without electrical interference can be provided by electrically isolating a high-voltage region for wireless charging and a low-voltage region for near field communication from each other.

While the battery pack with wireless charging and near field communication functions according to embodiments of the present invention has been particularly shown and described with reference to exemplary embodiments thereof, it will be understood by those of ordinary skill in the art that various changes in form and details may be made therein without departing from the spirit and scope of the present invention as defined by the following claims and their equivalents. It is therefore desired that the present embodiments be considered in all respects as illustrative and not restrictive, reference being made to the appended claims and their equivalents rather than the foregoing description to indicate the scope of the invention.

What is claimed is:

1. A battery pack comprising:
    an antenna attached to a battery cell;
    a sensor configured to sense an energy level induced in the antenna;
    a controller configured to determine, according to a sensed signal of the sensor, whether the energy level is a first energy level for wireless charging or is a second energy level for near field communication; and
    a switch connecting the antenna to a battery charger or a near field communication circuit according to a control signal of the controller.

2. The battery pack of claim 1, wherein, when the energy level is determined as the first energy level, the controller is configured to control the switch to connect the antenna to the battery charger, and
    wherein, when the energy level is determined as the second energy level, the controller is configured to control the switch to connect the antenna to the near field communication circuit.

3. The battery pack of claim 1, wherein the energy level corresponds to a voltage, a current, a power, or a frequency level.

4. The battery pack of claim 1, wherein the first energy level and the second energy level are different from each other.

5. The battery pack of claim 1, wherein the battery charger comprises:
    an AC-DC converter connected to the switch; and
    a charging circuit between the AC-DC converter and the battery cell.

6. The battery pack of claim 1, wherein the sensor, the controller, the switch, the battery charger, and the near field communication circuit are mounted on a circuit board, and the circuit board is combined with the battery cell.

7. The battery pack of claim 6, wherein, the battery charger and the near field communication circuit are electrically separated from each other.

8. The battery pack of claim 6, wherein the circuit board further comprises:
    an antenna terminal connected to an antenna wire of the antenna; and
    a mounting groove in which the antenna wire of the antenna is mounted.

9. The battery pack of claim 8, wherein an insulation member is between the antenna wire and the circuit board or is between the antenna wire and the battery cell.

10. The battery pack of claim 1, wherein the antenna comprises:
    a ferrite layer attached to the battery cell; and
    an antenna pattern attached to the ferrite layer.

11. The battery pack of claim 1, wherein the battery cell is a prismatic battery or a pouch-type battery.

* * * * *